US009283989B2

(12) United States Patent
Spahl et al.

(10) Patent No.: US 9,283,989 B2
(45) Date of Patent: Mar. 15, 2016

(54) LATERALLY TILTABLE, MULTITRACK VEHICLE

(71) Applicant: FORD GLOBAL TECHNOLOGIES, LLC, Dearborn, MI (US)

(72) Inventors: Robert Spahl, Cologne (DE); Edmund Halfmann, Neuss (DE); Torsten Gerhardt, London (GB); Marc Simon, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/201,628

(22) Filed: Mar. 7, 2014

(65) Prior Publication Data

US 2014/0252733 A1    Sep. 11, 2014

(30) Foreign Application Priority Data

Mar. 7, 2013  (DE) .......................... 10 2013 203 924

(51) Int. Cl.
| | |
|---|---|
| *B62D 9/04* | (2006.01) |
| *B62D 9/02* | (2006.01) |
| *B62K 5/10* | (2013.01) |
| *B60G 21/05* | (2006.01) |

(52) U.S. Cl.
CPC *B62D 9/04* (2013.01); *B60G 21/05* (2013.01); *B62D 9/02* (2013.01); *B62K 5/10* (2013.01); *B60G 2300/45* (2013.01)

(58) Field of Classification Search
CPC ............ B62D 9/04; B62D 9/02; B60G 21/05; B60G 2300/45; B62K 5/10
USPC .............. 280/5.509, 5.508, 124.128, 124.129
See application file for complete search history.

(56) References Cited

U.S. PATENT DOCUMENTS

| | | | | | |
|---|---|---|---|---|---|
| 2,353,503 | A | * | 7/1944 | Rost et al. ................... | 280/5.509 |
| 2,474,471 | A | * | 6/1949 | Dolan ........................... | 105/164 |
| 3,417,985 | A | * | 12/1968 | Hannan ......................... | 267/186 |
| 3,558,123 | A | | 1/1971 | Yew | |

(Continued)

FOREIGN PATENT DOCUMENTS

| | | |
|---|---|---|
| DE | 679 966 C | 8/1939 |
| DE | 1 937 578 U | 1/1963 |

(Continued)

OTHER PUBLICATIONS

German Search Report for Application No. 10 2013 203 923.9 dated Oct. 8, 2013.

(Continued)

*Primary Examiner* — Drew Brown
(74) *Attorney, Agent, or Firm* — Jones Robb, PLLC; Raymond L. Coppiellie

(57) ABSTRACT

A laterally tiltable, multitrack vehicle is disclosed. The vehicle includes a vehicle body and at least three wheels. The first and second wheels are assigned to a common axle to form a first wheel pair. A first wheel control part suspends the first wheel of the wheel pair from the vehicle body and a second wheel control part suspends the second wheel of the wheel pair from the vehicle body. The first wheel control part is coupled to the second wheel control part via a double lever rotatably mounted on the vehicle body. At least two pivot points for the double lever can be defined on the vehicle body, the pivot points being spaced apart in a direction of a longitudinal extent of the double lever.

28 Claims, 2 Drawing Sheets

(56) References Cited

U.S. PATENT DOCUMENTS

| | | | |
|---|---|---|---|
| 3,572,456 A | 3/1971 | Healy | |
| 4,375,293 A | 3/1983 | Solbes | |
| 5,040,812 A | 8/1991 | Patin | |
| 5,040,823 A | 8/1991 | Lund | |
| 5,069,476 A | 12/1991 | Tsutsumi et al. | |
| 5,116,069 A | 5/1992 | Miller | |
| 5,161,425 A | 11/1992 | Baskett et al. | |
| 5,161,822 A | 11/1992 | Lund | |
| 5,207,451 A | 5/1993 | Furuse et al. | |
| 5,324,056 A | 6/1994 | Orton | |
| 5,337,847 A | 8/1994 | Woods et al. | |
| 5,347,457 A | 9/1994 | Tanaka et al. | |
| 5,580,089 A | 12/1996 | Kolka | |
| 5,611,555 A | 3/1997 | Vidal | |
| 5,762,351 A | 6/1998 | SooHoo | |
| 5,765,115 A | 6/1998 | Ivan | |
| 5,765,846 A | 6/1998 | Braun | |
| 5,772,224 A | 6/1998 | Tong | |
| 5,791,425 A | 8/1998 | Kamen et al. | |
| 5,825,284 A | 10/1998 | Dunwoody et al. | |
| 5,839,082 A | 11/1998 | Iwasaki | |
| 5,927,424 A | 7/1999 | Van Den Brink et al. | |
| 6,026,920 A | 2/2000 | Obeda et al. | |
| 6,116,618 A | 9/2000 | Shono et al. | |
| 6,142,494 A * | 11/2000 | Higuchi | 280/93.51 |
| 6,149,226 A | 11/2000 | Hoelzel | |
| 6,213,561 B1 | 4/2001 | Witthaus | |
| 6,250,649 B1 | 6/2001 | Braun | |
| 6,311,795 B1 | 11/2001 | Skotnikov | |
| 6,328,125 B1 | 12/2001 | Van Den Brink et al. | |
| 6,367,824 B1 | 4/2002 | Hayashi | |
| 6,390,505 B1 | 5/2002 | Wilson | |
| 6,425,585 B1 | 7/2002 | Schuelke et al. | |
| 6,435,522 B1 | 8/2002 | Van Den Brink et al. | |
| 6,446,980 B1 | 9/2002 | Kutscher et al. | |
| 6,454,035 B1 | 9/2002 | Waskow et al. | |
| 6,460,835 B1 | 10/2002 | Hamano et al. | |
| 6,467,783 B1 | 10/2002 | Blondelet et al. | |
| 6,722,676 B2 | 4/2004 | Zadok | |
| 6,805,362 B1 | 10/2004 | Melcher | |
| 6,817,617 B2 * | 11/2004 | Hayashi | 280/5.509 |
| 7,066,474 B2 | 6/2006 | Hiebert et al. | |
| 7,073,806 B2 | 7/2006 | Bagnoli | |
| 7,097,187 B2 | 8/2006 | Walters et al. | |
| 7,131,650 B2 | 11/2006 | Melcher | |
| 7,229,086 B1 | 6/2007 | Rogers | |
| 7,389,592 B2 | 6/2008 | Tsuruta et al. | |
| 7,487,985 B1 | 2/2009 | Mighell | |
| 7,568,541 B2 | 8/2009 | Pfeil et al. | |
| 7,591,337 B2 | 9/2009 | Suhre et al. | |
| 7,607,695 B2 | 10/2009 | Moulene | |
| 7,640,086 B2 | 12/2009 | Nakashima et al. | |
| 7,641,207 B2 | 1/2010 | Yang | |
| 7,648,148 B1 | 1/2010 | Mercier | |
| 7,665,742 B2 | 2/2010 | Haerr et al. | |
| 7,673,883 B2 | 3/2010 | Damm | |
| 7,887,070 B2 | 2/2011 | Kirchner | |
| 7,896,360 B2 | 3/2011 | Buma | |
| 7,946,596 B2 | 5/2011 | Hsu et al. | |
| 8,050,820 B2 | 11/2011 | Yanaka et al. | |
| 8,104,781 B2 | 1/2012 | Gazarek | |
| 8,260,504 B2 | 9/2012 | Tsujii et al. | |
| 8,262,111 B2 * | 9/2012 | Lucas | 280/124.103 |
| 8,345,096 B2 | 1/2013 | Ishiyama et al. | |
| 8,641,064 B2 | 2/2014 | Krajekian | |
| 8,818,700 B2 | 8/2014 | Moulene | |
| 2001/0028154 A1 | 10/2001 | Sebe | |
| 2002/0109310 A1 | 8/2002 | Lim et al. | |
| 2002/0171216 A1 | 11/2002 | Deal | |
| 2003/0071430 A1 | 4/2003 | Serra et al. | |
| 2003/0102176 A1 | 6/2003 | Bautista | |
| 2003/0141689 A1 | 7/2003 | Hamy | |
| 2003/0197337 A1 | 10/2003 | Dodd et al. | |
| 2004/0051262 A1 | 3/2004 | Young | |
| 2004/0100059 A1 | 5/2004 | Van Den Brink | |
| 2004/0134302 A1 | 7/2004 | Ko et al. | |
| 2004/0236486 A1 | 11/2004 | Krause et al. | |
| 2005/0051976 A1 | 3/2005 | Blondelet et al. | |
| 2005/0082771 A1 | 4/2005 | Oh | |
| 2005/0127656 A1 | 6/2005 | Sato et al. | |
| 2005/0184476 A1 | 8/2005 | Hamm | |
| 2005/0199087 A1 | 9/2005 | Li et al. | |
| 2005/0206101 A1 | 9/2005 | Bouton | |
| 2005/0275181 A1 | 12/2005 | MacIsaac | |
| 2006/0049599 A1 | 3/2006 | Lehane | |
| 2006/0091636 A1 | 5/2006 | Shelton | |
| 2006/0151982 A1 | 7/2006 | Mills | |
| 2006/0170171 A1 | 8/2006 | Pedersen | |
| 2006/0220331 A1 | 10/2006 | Schafer et al. | |
| 2006/0226611 A1 | 10/2006 | Xiao et al. | |
| 2006/0249919 A1 | 11/2006 | Suzuki et al. | |
| 2006/0276944 A1 | 12/2006 | Yasui et al. | |
| 2007/0075517 A1 | 4/2007 | Suhre et al. | |
| 2007/0078581 A1 | 4/2007 | Nenninger et al. | |
| 2007/0126199 A1 | 6/2007 | Peng et al. | |
| 2007/0151780 A1 | 7/2007 | Tonoli et al. | |
| 2007/0182120 A1 | 8/2007 | Tonoli et al. | |
| 2007/0193803 A1 | 8/2007 | Geiser | |
| 2007/0193815 A1 | 8/2007 | Hobbs | |
| 2007/0228675 A1 | 10/2007 | Tonoli et al. | |
| 2008/0012262 A1 | 1/2008 | Carabelli et al. | |
| 2008/0033612 A1 | 2/2008 | Raab | |
| 2008/0100018 A1 | 5/2008 | Dieziger | |
| 2008/0114509 A1 | 5/2008 | Inoue et al. | |
| 2008/0135320 A1 | 6/2008 | Matthies | |
| 2008/0164085 A1 | 7/2008 | Cecinini | |
| 2008/0197597 A1 | 8/2008 | Moulene et al. | |
| 2008/0197599 A1 | 8/2008 | Comstock et al. | |
| 2008/0238005 A1 * | 10/2008 | James | 280/5.509 |
| 2008/0255726 A1 | 10/2008 | Fischlein et al. | |
| 2008/0258416 A1 | 10/2008 | Wilcox | |
| 2008/0272562 A1 | 11/2008 | Sabelstrom et al. | |
| 2009/0085311 A1 | 4/2009 | Kim et al. | |
| 2009/0105906 A1 | 4/2009 | Hackney et al. | |
| 2009/0108555 A1 | 4/2009 | Wilcox | |
| 2009/0171530 A1 | 7/2009 | Bousfield | |
| 2009/0289437 A1 | 11/2009 | Steinhilber | |
| 2009/0299565 A1 | 12/2009 | Hara et al. | |
| 2009/0312908 A1 | 12/2009 | Van Den Brink | |
| 2009/0314566 A1 | 12/2009 | Rust | |
| 2010/0025944 A1 | 2/2010 | Hara et al. | |
| 2010/0032914 A1 | 2/2010 | Hara et al. | |
| 2010/0032915 A1 | 2/2010 | Hsu et al. | |
| 2010/0044977 A1 | 2/2010 | Hughes et al. | |
| 2010/0044979 A1 | 2/2010 | Haeusler et al. | |
| 2010/0152987 A1 | 6/2010 | Gorai | |
| 2011/0006498 A1 | 1/2011 | Mercier | |
| 2011/0095494 A1 * | 4/2011 | White | 280/5.509 |
| 2011/0148052 A1 | 6/2011 | Quemere | |
| 2011/0215544 A1 | 9/2011 | Rhodig | |
| 2011/0254238 A1 | 10/2011 | Kanou | |
| 2012/0098225 A1 | 4/2012 | Lucas | |
| 2012/0248717 A1 * | 10/2012 | Tsujii et al. | 280/5.509 |
| 2013/0068550 A1 * | 3/2013 | Gale | 180/216 |
| 2013/0153311 A1 | 6/2013 | Huntzinger | |
| 2013/0168934 A1 | 7/2013 | Krajekian | |
| 2014/0252730 A1 | 9/2014 | Spahl et al. | |
| 2014/0252731 A1 | 9/2014 | Spahl et al. | |
| 2014/0252732 A1 | 9/2014 | Spahl et al. | |
| 2014/0252734 A1 | 9/2014 | Spahl et al. | |

FOREIGN PATENT DOCUMENTS

| | | |
|---|---|---|
| DE | 6801096 U | 11/1967 |
| DE | 40 35 128 A1 | 6/1992 |
| DE | 41 35 585 A1 | 5/1993 |
| DE | 42 36 328 C1 | 9/1993 |
| DE | 43 15 017 C1 | 9/1994 |
| DE | 196 21 947 C1 | 10/1997 |
| DE | 197 35 912 A1 | 3/1998 |
| DE | 198 48 294 A1 | 10/1999 |
| DE | 198 38 328 C1 | 12/1999 |
| DE | 198 31 162 A1 | 7/2000 |
| DE | 102 51 946 B3 | 3/2004 |

(56) References Cited

FOREIGN PATENT DOCUMENTS

| | | |
|---|---|---|
| DE | 103 49 655 A1 | 6/2005 |
| DE | 10 2004 027 202 A1 | 10/2005 |
| DE | 10 2004 058 523 A1 | 6/2006 |
| DE | 11 2006 002 581 T5 | 9/2008 |
| DE | 102007024769 A1 | 11/2008 |
| DE | 10 2008 046 588 A1 | 3/2010 |
| DE | 10 2009 042 662 A1 | 3/2011 |
| DE | 10 2010 000 884 A1 | 7/2011 |
| DE | 10 2010 000 886 A1 | 7/2011 |
| DE | 10 2010 055 947 A1 | 8/2011 |
| DE | 102010041404 A1 | 3/2012 |
| EP | 0 592 377 A1 | 4/1994 |
| EP | 0 626 307 A1 | 11/1994 |
| EP | 0 658 453 B1 | 6/1995 |
| EP | 1 030 790 B1 | 8/2000 |
| EP | 1 142 779 A2 | 10/2001 |
| EP | 1 153 773 A2 | 11/2001 |
| EP | 1 155 950 A2 | 11/2001 |
| EP | 1 180 476 B1 | 2/2002 |
| EP | 1 228 905 A2 | 8/2002 |
| EP | 1 346 907 A2 | 9/2003 |
| EP | 1 348 617 B1 | 10/2003 |
| EP | 1 419 909 B1 | 5/2004 |
| EP | 1 539 563 B1 | 6/2005 |
| EP | 1 630 081 A1 | 3/2006 |
| EP | 1 702 773 A2 | 9/2006 |
| EP | 1 872 981 A1 | 1/2008 |
| EP | 1 944 228 A1 | 7/2008 |
| EP | 2 030 814 A2 | 3/2009 |
| EP | 2077223 A1 | 7/2009 |
| EP | 2 199 122 A1 | 6/2010 |
| EP | 2 213 561 A1 | 8/2010 |
| FR | 2 663 283 A1 | 12/1991 |
| FR | 2 768 203 A1 | 3/1999 |
| FR | 2 872 699 A1 | 1/2006 |
| FR | 2 927 026 A1 | 8/2009 |
| FR | 2 937 000 A1 | 4/2010 |
| FR | 2 946 944 A1 | 12/2010 |
| GB | 2 322 837 A | 9/1998 |
| GB | 2 382 334 A | 11/2001 |
| GB | 2 374 327 A | 10/2002 |
| GB | 2 390 065 A | 12/2003 |
| GB | 2 394 701 A | 5/2004 |
| GB | 2 444 250 A | 6/2008 |
| GB | 2 450 740 A | 1/2009 |
| GB | 2 472 180 A | 2/2011 |
| GB | 2 492 757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | WO-2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011/023862 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011/107674 A1 | 9/2011 |

OTHER PUBLICATIONS

German Search Report for Application No. 10 2013 203 922.0 dated Oct. 14, 2013.
German Search Report for Application No. 10 2013 203 927.1 dated Nov. 5, 2013.
German Search Report for Application No. 10 2013 203 926.3 dated Oct. 31, 2013.
German Search Report for Application No. 10 2013 203 924.7 dated Oct. 24, 2013.
Office Action dated Nov. 28, 2014 for U.S. Appl. No. 14/201,550.
Office Action dated Oct. 10, 2014 for U.S. Appl. No. 14/201,602.
Office Action dated Dec. 19, 2014 for U.S. Appl. No. 14/201,586.
Office Action dated Jan. 29, 2015 for U.S. Appl. No. 14/201,616.

\* cited by examiner

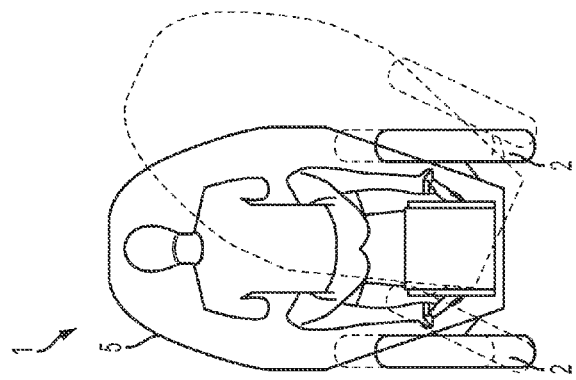
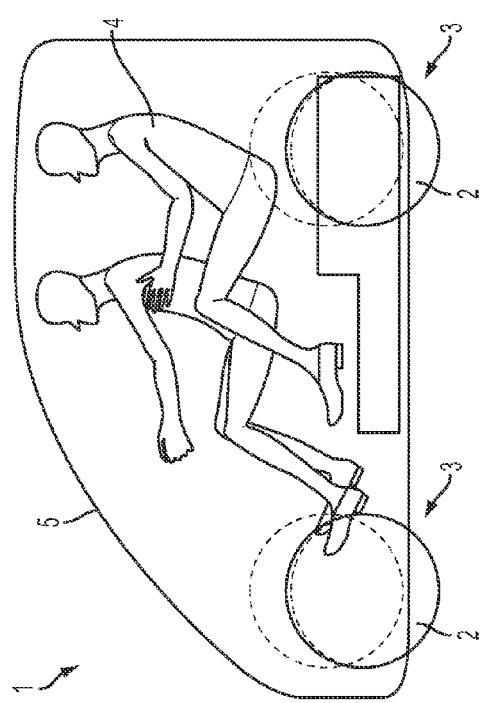
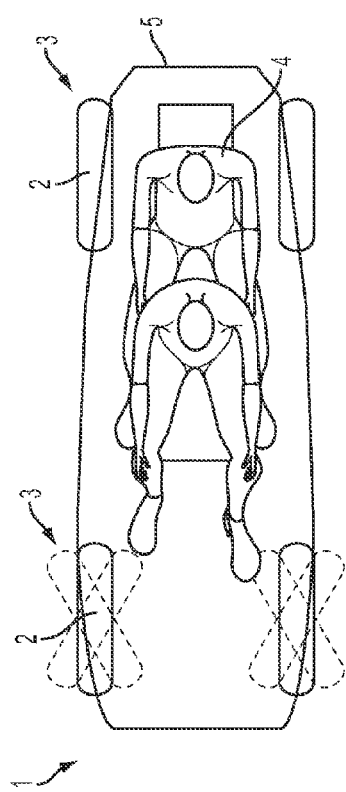
FIG. 1A
FIG. 1B
FIG. 1C

LATERALLY TILTABLE, MULTITRACK VEHICLE

CROSS REFERENCE TO RELATED APPLICATIONS

This application claims priority to German Application No. 102013203924.7, filed on Mar. 7, 2013, the entire content of which is incorporated by reference herein. This application also is related to German Application No. 102013203922.0, filed Mar. 7, 2013; German Application No. 102013203927.1, filed Mar. 7, 2013; German Application No. 102013203926.3, filed Mar. 7, 2013; and German Application No. 102013203923.9, filed Mar. 7, 2013, the entire content of each of which is incorporated by reference herein.

TECHNICAL FIELD

The present disclosure relates generally to a laterally tiltable multitrack vehicle, such as a motor vehicle, and more particularly to a laterally tiltable multitrack vehicle having the ability to self-upright after tilting.

BACKGROUND

In recent years, interest in vehicles with innovative designs has grown in view of continued expansion of urban areas, the large number of vehicles operating in these areas, and the associated problems, such as traffic jams or environmental pollution. One way to solve parking problems and/or to improve the traffic flow is to design vehicles in a manner that permits a plurality of vehicles to share a parking space or a driving lane. In order for such a solution to be feasible, vehicles must be small and, in particular, narrow. A vehicle of this type is usually sized to convey no more than one to two persons. The small size and the low weight of such vehicles make it possible to reduce the engine power output and also the emissions caused by the vehicle without any loss of driving performance.

Many attempts have been made in recent years to develop multitrack, laterally tiltable vehicles, in which the entire vehicle or a part thereof tilts in toward a rotation center (e.g., the curve bend inner side) in a similar manner to a bicycle when driving around curves. With such tilting, the resultant of the weight force and the centrifugal force runs substantially along the vertical axis of the vehicle body, preventing the vehicle from turning over. Accordingly, lateral tipping of the vehicle toward the bend outer side can be prevented, even in the case of a relatively narrow track width of the laterally tiltable vehicle (as compared with conventional, multitrack vehicles).

Different types of laterally tiltable vehicles having three or four wheels have been disclosed in practice. For example, in some three-wheeled vehicles, merely the vehicle body and the central wheel can be tilted, whereas the wheel pair has two eccentric wheels which are arranged on a common axle and cannot be tilted. In general, however, a solution is preferred, in which all the wheels can tilt together with the vehicle body, since this solution requires less installation space in relation to the width of the vehicle and the vehicle is therefore of narrower overall design.

One important aspect in laterally tiltable vehicles is ability to right itself (self-uprighting) after tilting. Normally, the centroid of the vehicle drops during lateral tilting of the vehicle body. This means, however, that the vehicle body of the laterally tilted, multitrack vehicle will not upright itself again automatically. An elegant possibility for achieving automatic uprighting of the laterally tilted vehicle body is to raise the centroid of the vehicle during lateral tilting as the tilting angle increases. In addition, this solution affords the essential advantage that the vehicle automatically assumes a stable, upright position even at a standstill, since the centroid of the vehicle is at the lowest in this position. Accordingly, the present disclosure is directed to providing an automatic self-uprighting multitrack, laterally bitable vehicle. The present disclosure is further directed to providing such a vehicle having a compact overall design, in order to keep the required installation space as small as possible in order to realize a narrow vehicle.

SUMMARY

In accordance with various exemplary embodiments, the present disclosure provides a laterally tiltable, multitrack vehicle. The vehicle comprises a vehicle body and three wheels, first and second wheels of the three wheels being assigned to a common axle to form a first wheel pair. A first wheel control part suspends the first wheel of the wheel pair from the vehicle body and a second wheel control part suspends the second wheel of the wheel pair from the vehicle body. The first wheel control part is coupled to the second wheel control part via a double lever rotatably mounted on the vehicle body. At least two pivot points for the double lever can be defined on the vehicle body, the pivot points being spaced apart in a direction of a longitudinal extent of the double lever.

In accordance with one aspect of the present disclosure, the laterally tiltable, multitrack vehicle is a motor vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 1A shows a plan view of a first exemplary embodiment of a multitrack, laterally tiltable vehicle in accordance with the present disclosure;

FIG. 1B shows a side view of the first exemplary embodiment of a multitrack, laterally tiltable vehicle of FIG. 1A in accordance with the present disclosure;

FIG. 1C shows a rear view of the first exemplary embodiment of a multitrack, laterally tiltable vehicle of FIG. 1A in accordance with the present disclosure;

Figure 2A:
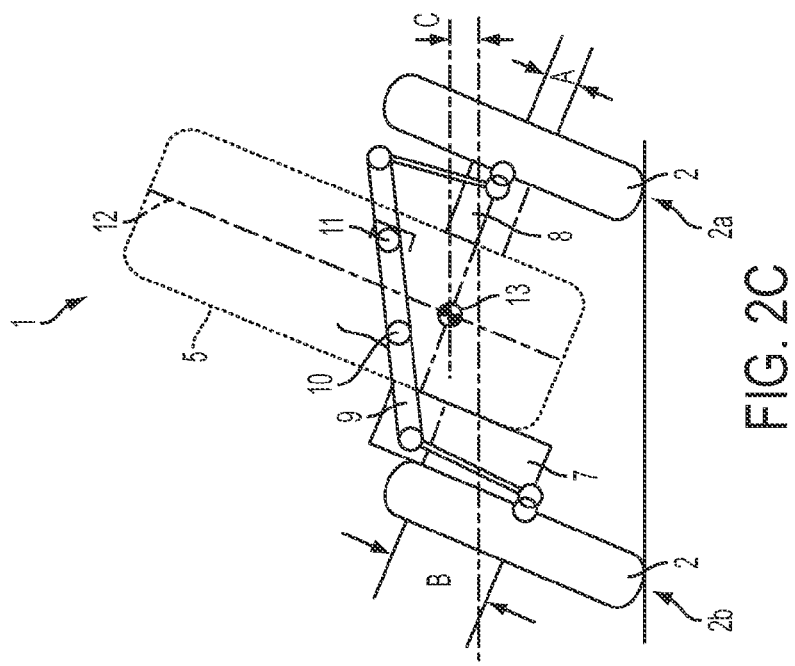
FIG. 2A is a side view of a connection structure used to connect and support a wheel pair of the multitrack, laterally tiltable vehicle of FIGS. 1A-1C.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a laterally tiltable, multitrack motor vehicle is provided. The vehicle has at least three wheels, a vehicle body, for example a vehicle frame, and at least one wheel pair. The wheel pair includes two wheels which are assigned to a common axle. Each of the wheels of the wheel pair is suspended on the vehicle body via a respective wheel control part. Here, one wheel of the wheel pair is suspended on the vehicle body via a first wheel control part, for example a wheel control link such as a longitudinal link or wishbone, and the other wheel of the wheel pair is suspended on the vehicle body via a second wheel control part, for example a wheel control link such as a longitudinal link or wishbone. The first wheel control part is coupled to the second wheel control part via a double lever rotatably mounted on the vehicle body. For example, the first wheel control part is connected in an articulated manner to a free end of the double lever and the second wheel control part is connected in an articulated manner to the other free end of the double lever. A pivot point of the double lever is situated between the two free ends of the double lever. A connecting line of the two ends of the double lever substantially fixes the longitudinal extent of the double lever in the context of the present disclosure.

In accordance with the present teachings, at least two pivot points, which are spaced apart from one another in a direction of the longitudinal extent of the double lever, can be fixed on the vehicle body for the double lever. Optionally, the double lever of the present disclosure can be mounted on the vehicle body such that it can be rotated about the first pivot point or such that it can be rotated about the second pivot point. Selection of the pivot point determines the effective lever length, by which the first wheel control part is coupled to the second wheel control part, and changing the pivot point changes the effective lever length. In particular, the effective lever length results from the spacing of the articulation point of a wheel control part on the double lever from the pivot point of the double lever.

Figure 2B:
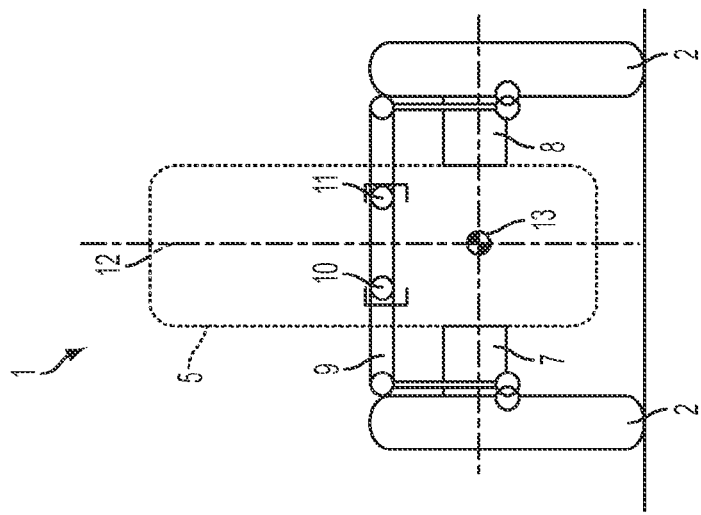
FIG. 2B is a rear view of the multitrack, laterally tiltable vehicle of FIGS. 1A-1C in an upright position.
Figure 2C:
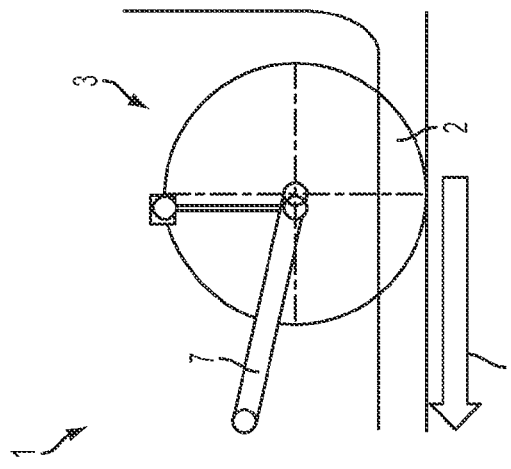
FIG. 2C is a rear view of the multitrack, laterally tiltable vehicle of FIGS. 1A-1C in a first tilted position.

When a laterally tiltable multitrack vehicle in accordance with the present teachings drives through a bend, for example, the pivot point of the double lever is defined on the vehicle body such that the wheel control part which is assigned to the outer wheel in the bend, for example the first wheel control part, is coupled by a relatively large effective lever length to the second wheel control part, assigned to the inner wheel in the bend, the second wheel control part accordingly being articulated on the double lever via a relatively small effective lever length (see, e.g., FIG. 2C). If both the vehicle body and the wheels then tilt toward the inner side of the bend (i.e., the inner curve of the bend), the outer wheel in the bend and, as a consequence, the first wheel control part move away from the vehicle body (downward as viewed from the vehicle body). Since the first wheel control part is coupled to the second wheel control part via the double lever rotatably mounted on the vehicle body, the inner wheel in the bend and, as a consequence, the second wheel control part move in the opposite direction to the first wheel control part, that is to say toward the vehicle body (upward as viewed from the vehicle body). The greater effective lever length, with which the first wheel control part is articulated on the double lever, in comparison with the effective lever length with which the second wheel control part is articulated on the double lever, ensures that the inner, second wheel control part in the bend moves upward by a smaller amount than the outer, first wheel control part in the bend moves downward. This cause the vehicle body, which is tilted laterally toward the inner side of the bend, and the centroid of the vehicle to be raised up. As a result, automatic self-uprighting of the vehicle body into the upright, neutral position is made possible, since the centroid of the vehicle has the lowest location when the vehicle body is in the upright, neutral position.

When the laterally tiltable multitrack vehicle in accordance with the present teachings drives through a bend in the opposite direction, the vehicle body and the wheels of the vehicle again tilt toward the inner side of the bend and, therefore, in the opposite direction to the above-described example. The pivot point of the double lever on the vehicle body is then fixed in such a way that the second wheel control part, which is assigned to the outer wheel in the bend, is coupled via a greater effective lever length to the first wheel control part, which is assigned to the inner wheel in the bend and is, accordingly, articulated on the double lever via a smaller effective lever length. If the vehicle body and the wheels then tilt toward the inner side of the bend, the outer wheel in the bend and, as a consequence, the second wheel control part move away from the vehicle body (downward as viewed from the vehicle body). Since the second wheel control part is coupled to the first wheel control part via the double lever rotatably mounted on the vehicle body, the inner wheel in the bend and, as a consequence, the first wheel control part move in the opposite direction to the second wheel control part, that is to say toward the vehicle body (upward as viewed from the vehicle body). The greater effective lever length, with which the second wheel control part is articulated on the double lever, in comparison with the effective lever length, with which the first wheel control part is articulated on the double lever, ensures that the inner, first wheel control part in the bend moves upward by a smaller amount than the outer, second wheel control part in the bend moves downward. This leads to the vehicle body, which is tilted laterally toward the inner side of the bend, and the centroid of the vehicle to be raised up. As a result, automatic self-uprighting of the vehicle body into the upright, neutral position is made possible as described above.

In accordance with the present teachings, the provision of the selectively definable and spaced apart pivot points of the double lever advantageously require minimal installation space. The solution for automatically self-uprighting a laterally tiltable, multitrack vehicle in accordance with the present disclosure can therefore be realized in a particularly compact manner.

In accordance with one aspect of the present disclosure, each pivot point is formed by a pivot joint, which can be releasably defined on the vehicle body.

Additionally, in order to provide satisfactory driving comfort of a vehicle in accordance with the present disclosure, each wheel may be mounted on the respective wheel control part in a manner which is resilient and damped in terms of oscillations. Thus, oscillations of the respective wheel due to, for example, an uneven surface, are absorbed directly at the wheel itself and are not substantially transmitted to the double lever and thus to the other wheel control part, at least not in an undamped manner.

In accordance with another aspect of the present disclosure, the wheel control parts are longitudinal links. The longitudinal links are pivotably mounted at one end on the vehicle body and are rotatably mounted at the other end on the respective wheel. Accordingly, each wheel of the wheel pair is suspended independently on the vehicle body via one longitudinal link. In particular, in the case of the multitrack, laterally tiltable motor vehicle which has driven rear wheels, a longitudinal link suspension system affords the advantage that the rear wheels can be driven via a chain or belt drive.

In one exemplary embodiment, the multitrack, laterally tiltable vehicle includes two wheel pairs. The first wheel pair of the vehicle forms steerable front wheels and the second wheel pair forms the rear wheels of the vehicle.

FIGS. 1A-1C show a plan view, a side view, and a rear view of a first exemplary embodiment of a multitrack, laterally tiltable motor vehicle 1. In accordance with the present teachings, the vehicle 1 has a total of four wheels 2, two wheels 2 which are assigned to a common axle to form a wheel pair 3. As can be seen in FIGS. 1A-1C, the vehicle 1 has a front wheel pair 3, in which the wheels 2 are steerable and a rear, non-steerable wheel pair 3. The vehicle 1 is designed for transporting from one to two persons or occupants 4, the two vehicle occupants 4 sitting one behind the other in the vehicle 1, as shown in FIGS. 1A-1C. As shown in FIGS. 1A-1C, the vehicle 1 has a closed vehicle body 5 which protects the occupants 4, for example, against external weather influences and additionally provides the occupants 4 with improved safety in comparison with an open vehicle body.

As shown in the rear view of FIG. 1C, both the vehicle body 5 and the wheels 2 tilt during the lateral tilting of the vehicle 1. The laterally tilted vehicle 1 is illustrated in the rear view by a dashed line in FIG. 1C.

The drive of the vehicle 1 may be, for example, an electric motor or a combustion engine, or a combination of an electric motor and a combustion engine (a hybrid drive).

FIGS. 2A-2C show a side view, a first rear view, a second tilted rear view, and a third tilted rear view of the vehicle 1 which is shown in FIGS. 1A-1C. In FIG. 2A, the forward driving direction of the vehicle 1 is indicated by a corresponding arrow 6. FIG. 2B shows the vehicle 1, as viewed from behind, in a non-inclined, upright position. FIG. 2C shows the vehicle 1 in a position which is tilted laterally to the right in the drawing. Each of FIGS. 2A-2C show the wheels 2 of the rear wheel pair 3 of the vehicle 1 which is shown in FIGS. 1A-1C.

As shown in FIGS. 2A-2C, one wheel 2 of the wheel pair 3 is suspended on the vehicle body 5 by means of a first wheel control part 7, which is formed by, for example, a first longitudinal link 7, and the other heel 2 of the wheel pair 3 is suspended on the vehicle body 5 by means of a second wheel control part 8, formed by, for example, a second longitudinal link 8. Each longitudinal link 7 and 8 is pivotably mounted at one end on the vehicle body 5 and is rotatably mounted at the other end to the respective wheel 2.

A double lever 9 is illustrated in FIGS. 2B and 2C. The double lever 9 is rotatably mounted on the vehicle body 5. Two pivot points 10 and 11, which are spaced apart from one another, optionally may be fixed for the double lever 9. The pivot points 10 and 11 can be formed, for example, by rotary joints that can be releasably fastened to the vehicle body. The pivot points 10 and 11 are situated on either side of a central longitudinal plane 12 (see FIGS. 2B and 2C) of the vehicle 1. As shown in FIGS. 2A-2C, the first wheel control part 7 is connected in an articulated manner to a free end of the double lever 9 and the second wheel control part 8 is connected in an articulated manner to the other free end of the double lever 9. Accordingly, both wheel control parts (longitudinal links 7 and 8) are coupled to one another via the double lever 9, which is rotatably mounted on the vehicle body 5. The longitudinal extent of the double lever 9 is substantially fixed by the connecting line of its two free ends.

FIG. 2C shows the vehicle body 5 and the wheels 2 of the wheel pair 3 tilted to the right as the vehicle 1 drives around a right-hand bend, for example. In this case, the double lever 9 is fixed on the vehicle body 5 such that it can be rotated about the second pivot point 11, whereas the first pivot point 10 is released. This means that the effective lever length between the articulation point of the first wheel control part 7 on the double lever 9 and the second pivot point 11 is greater than the effective lever length between the second pivot point 11 and the articulation point of the second wheel control part 8 on the double lever 9. As shown in FIG. 2C, the outer wheel 2b and the outer, first longitudinal link 7 move downward away from the vehicle body 5. The coupling of the first longitudinal link 7, by means of the double lever 9 mounted rotatably on the vehicle body 5 via the second pivot point 11, to the second longitudinal link 8 causes the inner wheel 2a and, as a consequence, the inner, second longitudinal link 8 to move in the opposite direction to the first longitudinal link 7, that is to say it moves upward toward the vehicle body 5. Due to the different lever lengths between the respective linking points of the longitudinal links 7 and 8 on the double lever 9 and the second pivot point 11, the inner, second longitudinal link 8 moves upward by an amount A which is smaller than an amount that the outer, first longitudinal link 7 moves downward (amount B). This causes the vehicle body 5, which is tilted laterally toward the inner side of the bend, and the centroid 13 of the vehicle 1 to each be raised by an amount C, as is shown in FIGS. 2B and 2C by two dash-dotted lines which run horizontally through the centroid 13 in the drawings. The raising of the centroid 13 during the lateral tilting of the vehicle 1 makes automatic self-uprighting of the vehicle body 5 into the upright, neutral position possible, since the centroid 13 of the vehicle 1 has the lowest location when the vehicle body 5 is in the upright, neutral position.

A laterally tiltable, multitrack vehicle as described above and in accordance with the present teachings is not restricted to the exemplary embodiment(s) disclosed herein, but rather also encompasses other embodiments which have an identical effect. For example, the two pivot points for the double lever could be fixed by lateral displacement from one side to the other side of the central longitudinal plane of a rotary joint which is connected to the vehicle body, for example also depending on the lateral tilting of the vehicle body. Moreover, instead of via longitudinal links, the wheels of the vehicle can also be suspended on the vehicle body via transverse links.

In addition, a laterally tiltable, multitrack vehicle in accordance with the present teachings need not be a motor vehicle and instead may be a vehicle powered by other means, including being powered by the occupants of the vehicle themselves (e.g., muscle power). That is to say, although the present teachings are described with respect to a motor vehicle, other vehicles are encompassed within the scope of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A laterally tiltable, multitrack vehicle, comprising:
   a vehicle body;
   three wheels;
   first and second wheels of the three wheels assigned to a common axle to form a first wheel pair;
   a first wheel control part suspending the first wheel of the wheel pair from the vehicle body and a second wheel control part suspending the second wheel of the wheel pair from the vehicle body, the first wheel control part being coupled to the second wheel control part via a double lever rotatably mounted on the vehicle body,
   wherein at least two pivot points for the double lever can be fastened to the vehicle body, the pivot points being spaced apart in a direction of a longitudinal extent of the double lever.

2. The vehicle as claimed in claim 1, wherein each of the pivot points is formed by a pivot joint that is selectively releasable from the vehicle body during travel of the vehicle.

3. The vehicle as claimed in claim 2, wherein the pivot joints are selectively releasable from the vehicle body so that one of the pivot joints remains fastened to the vehicle body during tilting of the vehicle while another pivot joint is released from the vehicle body during the tilting.

4. The vehicle as claimed in claim 1, wherein each wheel is mounted on the respective wheel support in a manner which is resilient and damped in terms of oscillations.

5. The vehicle as claimed in claim 1, wherein the first and second wheel control parts are longitudinal links, a first end of each longitudinal link being pivotably mounted on the vehicle body and a second end of each link being rotatably mounted to the respective wheel.

6. The vehicle as claimed in claim 1, further comprising a fourth wheel, the third and fourth wheels forming a second wheel pair.

7. The vehicle as claimed in claim 6, wherein one wheel pair forms steerable front wheels and the second wheel pair forms rear wheels of the vehicle.

8. The vehicle as claimed in claim 1, wherein the vehicle is a motor vehicle.

9. The vehicle as claimed in claim 1, wherein the pivot points are located on either side of a central longitudinal plane of the vehicle.

10. The vehicle as claimed in claim 1, wherein the vehicle body is a closed vehicle body.

11. A laterally tiltable, multitrack vehicle, comprising:
    a vehicle body;
    three wheels;
    first and second wheels of the three wheels assigned to a common axle to form a first wheel pair;
    a first wheel control part suspending the first wheel of the wheel pair from the vehicle body and a second wheel control part suspending the second wheel of the wheel pair from the vehicle body, the first wheel control part being coupled to the second wheel control part via a double lever rotatably mounted on the vehicle body,
    wherein the double lever is releasably connected to the vehicle body via at least two pivot points, and wherein the at least two pivot points are configured to be selectively released from the vehicle body to change an axis of rotation of the double lever.

12. The vehicle as claimed in claim 11, wherein the at least two pivot points are configured to be selectively released based on a direction of tilt of the vehicle body.

13. The vehicle as claimed in claim 11, wherein each of the pivot points is formed by a pivot joint that is selectively releasable to the vehicle body during travel of the vehicle.

14. The vehicle as claimed in claim 11, wherein each wheel is mounted on the respective wheel support in a manner which is resilient and damped in terms of oscillations.

15. The vehicle as claimed in claim 11, wherein the first and second wheel control parts are longitudinal links, a first end of each longitudinal link being pivotably mounted on the vehicle body and a second end of each link being rotatably mounted to the respective wheel.

16. The vehicle as claimed in claim 11, further comprising a fourth wheel, the third and fourth wheels forming a second wheel pair.

17. The vehicle as claimed in claim 16, wherein one wheel pair forms steerable front wheels and the second wheel pair forms rear wheels of the vehicle.

18. The vehicle as claimed in claim 11, wherein the vehicle is a motor vehicle.

19. The vehicle as claimed in claim 11, wherein the pivot points are located on either side of a central longitudinal plane of the vehicle.

20. A laterally tiltable, multitrack vehicle, comprising:
    first and second wheels assigned to a common axle;
    a third wheel;
    first and second wheel control parts suspending, respectively, the first and second wheels from a vehicle body;
    a double lever comprising a single element rotatably mounted on the vehicle body and coupling the first and second wheel control parts,
    wherein an effective length of the double lever is selectively variable.

21. The vehicle as claimed in claim 20, wherein the effective length of the double lever is a length of the double lever between one of the first and second wheel control parts and at least one pivot point at which the double lever is rotatably mounted to the vehicle body.

22. The vehicle as claimed in claim 21, wherein the at least one pivot point comprises two pivot points,
wherein the respective length is selectively variable by changing a pivot point at which the double lever is rotatably mounted to the vehicle body.

23. The vehicle as claimed in claim 20, wherein the double lever is rotatably mounted to rotate about an axis substantially perpendicular to a longitudinal axis of the double lever.

24. A laterally tiltable, multitrack vehicle, comprising:
first and second wheels assigned to a common axle;
a third wheel;
first and second wheel control parts suspending, respectively, the first and second wheels from a vehicle body;
a double lever rotatably mounted on the vehicle body and coupling the first and second wheel control parts,
wherein an effective length of the double lever is selectively variable;
wherein the double lever is releasably fastened to the vehicle body via at least two pivot points.

25. The vehicle as claimed in claim 24, wherein the at least two pivot points are configured to be selectively and individually released from the vehicle body.

26. The vehicle as claimed in claim 24, wherein the at least two pivot points are configured to be selectively released from the vehicle body based on a direction of tilt of the vehicle body.

27. The vehicle as claimed in claim 24, wherein each of the at least two pivot points is formed by a pivot joint that is selectively releasable from the vehicle body during travel of the vehicle.

28. The vehicle as claimed in claim 24, wherein an effective length of the double lever is varied by selectively releasing one of the at least two pivot points.

* * * * *